United States Patent
Hsu et al.

(10) Patent No.: US 6,453,411 B1
(45) Date of Patent: *Sep. 17, 2002

(54) SYSTEM AND METHOD USING A HARDWARE EMBEDDED RUN-TIME OPTIMIZER

(75) Inventors: Wei C. Hsu; Manuel Benitez, both of Cupertino, CA (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/252,170

(22) Filed: Feb. 18, 1999

(51) Int. Cl.[7] .............................................. G06F 15/00
(52) U.S. Cl. ...................... 712/237; 712/238; 712/239; 711/202; 711/203; 711/204; 711/205; 711/206
(58) Field of Search ................................. 711/202–206; 712/237–239; 395/704, 709; 707/3, 101

(56) References Cited

U.S. PATENT DOCUMENTS

| | | | | |
|---|---|---|---|---|
| 4,611,281 A | * | 9/1986 | Suko et al. | 714/39 |
| 4,704,679 A | * | 11/1987 | Hassler et al. | 711/220 |
| 5,146,586 A | * | 9/1992 | Nakano | 395/575 |
| 5,446,876 A | * | 8/1995 | Levine et al. | 714/47 |
| 5,557,786 A | * | 9/1996 | Johnson, Jr. | 707/101 |
| 5,668,969 A | * | 9/1997 | Fitch | 711/202 |
| 5,901,318 A | * | 5/1999 | Hsu | 395/709 |
| 5,909,578 A | * | 6/1999 | Buzbee | 395/704 |
| 5,950,009 A | * | 9/1999 | Bortnikov et al. | 395/709 |
| 6,006,033 A | * | 12/1999 | Heisch | 395/709 |
| 6,009,270 A | * | 12/1999 | Mann | 395/704 |
| 6,029,004 A | * | 2/2000 | Bortnikov et al. | 395/709 |
| 6,061,776 A | * | 5/2000 | Burger et al. | 712/14 |
| 6,085,186 A | * | 7/2000 | Christianson et al. | 707/3 |
| 6,115,809 A | * | 9/2000 | Mattson, Jr. et al. | 712/239 |
| 6,205,545 B1 | * | 3/2001 | Shah et al. | 712/237 |

OTHER PUBLICATIONS

Rotenberg, Eric, et al. "Trace Cache: A Low Latency Approach to High Bandwidth Instruction Fetching," IEEE 1072–4451/96.

\* cited by examiner

*Primary Examiner*—Zarni Maung
*Assistant Examiner*—Nabil El-Hady

(57) ABSTRACT

The inventive mechanism has a run-time optimization system (RTOS) embedded in hardware. When the code is first moved into Icache, a threshold value is set into a counter associated with the instruction or instruction bundle of the particular cache line of the Icache. Each time the instruction or instruction bundle is executed and retired, the counter is decremented by one. When the counter reaches zero, a trap is generated to inform that the code is hot. A trace selector will form a trace starting from the hot instruction (or instruction bundle) from the Icache line. The Icache maintains branch history information for the instructions in each cache line which is used to determine whether a branch should be predicted as taken or fall through. After the trace is formed, it is optimized and stored into a trace memory portion of the physical memory. The mapping between the original code of the trace and the optimized trace in the trace memory is maintained in a mapping table. The processor consults the mapping table to lead the execution to the optimized code in trace memory. Thus, subsequent execution uses the code in trace memory.

16 Claims, 2 Drawing Sheets

SYSTEM AND METHOD USING A HARDWARE EMBEDDED RUN-TIME OPTIMIZER

REFERENCE TO RELATED APPLICATIONS

Reference is made to the following co-pending and commonly assigned U.S. Pat. No. 6,185,669, issued Feb. 6, 2001 and entitled SYSTEM FOR FETCHING MAPPED BRANCH TARGET INSTRUCTIONS OF OPTIMIZED CODE PLACED INTO A TRACE MEMORY, which is hereby incorporated by reference, and co-pending U.S. patent application Ser. No. 09/252,567, filed Feb. 18, 1999 entitled HARDWARE/SOFTWARE SYSTEM FOR INSTRUCTION PROFILING AND TRACE SELECTION USING BRANCH HISTORY INFORMATIONS FOR BRANCH PREDICTIONS, which is hereby incorporated by reference.

TECHNICAL FIELD OF THE INVENTION

This application relates in general to run-time optimizers, and in specific to hardware embedded rim-time optimizer.

BACKGROUND OF THE INVENTION

A run-time optimizer is an adaptive software system that transparently optimizes applications at run-time. The optimizer rewrites the binary code of an application on-the-fly to achieve a higher execution efficiency.

FIG. 4 depicts prior art run-time optimizer 30. The control loop 31 begins execution of a block of program code via emulation performed by the profiling emulator 32. The profiling aspect of emulator 32 allows the control loop 31 to track the number of times the particular block of code has been executed via emulation. Note that a run-time optimization system is different from a run-time binary translation system, in that the latter is for architecture migration while the former is to decrease execution time. The run-time optimization system is using the emulator 32 for profiling in order to guide optimizations, i.e. the code is running on its native system. After a predetermined number of executions via emulation, the control loop 31 designates the block of code as hot code, and desirable for optimization. The control loop 31 then activates trace selector 33 to translate the block of code. The trace selector 33 forms a trace of the instructions that comprise the block of code by following the instructions in the block. When a branch instruction is encountered, the trace selector makes a prediction as to whether the branch is taken or falls through. If the selector decides the branch is mostly taken, then the trace is formed by extending the code from the branch target block. If the selector decides not to take the branch, then the branch falls through, and the trace continues within the fall through block. The trace terminates at a backward branch predicted to be taken or when the trace becomes sufficiently large. After the trace is completed, the code is rewritten with machine dependent and machine independent optimizations. The optimized code is then placed into the code cache 34. The next time the control loop 31 encounters a condition to execute this block of code, then the control loop 31 will execute the code in the code cache 34 and not emulate the code via emulator 32.

As shown in FIG. 5, if the target of a branch which is taken to exit trace 1, as shown by branch instruction 41, then control is returned to the run-time system RTS 30 and to control loop 31, which determines if the target resides in the code cache. If the target resides in code cache, then the control loop 31 modifies the target of the branch instruction 41 to be the trace 2 42 in code cache as shown by branch instruction 43. This modification is called backpatching. Thus, if the exit of the trace is already translated, then the branch is backpatched such that a subsequent execution will directly branch to the new trace without returning to the control loop. Backpatching increases the speed of execution of the code, as returning to the RTS significantly slows down execution time.

A problem with FIG. 4 is that an emulator is required to perform profiling, i.e. the emulated code is used to determine which code is hot. Emulation is very slow, usually 50–200 times slower than native execution speed. Consequently, there is a large time penalty for determining which code is hot. Moreover, the quality of optimization is often determined by the quality of the selected trace. Poor trace selection can be costly, for example, predicting a branch not to be taken means the remainder of the block code is traced and optimized, and if mispredicted, then that tracing and optimizing of the code subsequent to the branch is wasted. Branch misprediction can be minimized by maintaining a long history of branching outcomes, which is formed by continually emulating the code block. Thus, the prior art RTS either incurs a time penalty from emulation to build a good history or incurs a time penalty from branch misprediction.

Another problem with the prior art RTS is that it cannot backpatch an indirect branch. The RTS cannot backpatch an indirect branch because the target address is unknown. The target address is typically in a register or memory location and not written directly in code. Thus, the RTS will shift control back to the control loop 31 to determine whether the target address has been translated, which is expensive in terms of time. The prior art has attempted to minimize this problem by inlining a code sequence to search a smaller lookup table in the optimized traces, however, these mechanism still incur high overhead. Examples of indirect branches are return branches and switch branches.

A further problem with the prior art RTS is that it attempts to translate any code that is deemed hot based on a small threshold. This problem is referred to as complex and less reliable. There are some traces that are difficult to translate, but, without a translation, the execution of the trace would be performed by software simulation or emulation. Since emulation is slow, all hot code is translated. Some traces are very difficult to translate. For example, it is difficult to translate a trace with branches in the delay slot of another branch. The requirement of translating all hot code increases the translation time and complexity.

A further problem with the prior art RTS is that it will handle only user code and not operating system (OS) code. This is because the RTS is layered between the user application and the OS, and thus will not handle privileged instructions and addressing modes. In the prior art, the RTS is attached to user processes. Since the prior art RTS cannot be attached to the OS, it does not handle OS code.

Therefore, there is a need in the art for a RTS that does not require emulation for profiling, can handle indirect branches without returning control to a control loop, can refuse translation of difficult code and will handle OS code.

SUMMARY OF THE INVENTION

These and other objects, features and technical advantages are achieved by a system and method which embeds the control loop in hardware and, thus, does not require emulation for profiling, can handle indirect branches, will not translate difficult code, and will handle OS code. The inventive run-time optimization system (RTOS) places the control loop in the hardware and the translation/optimization components in the firmware, which are both below the OS level. Hence, the OS code can also be optimization candidates.

The inventive RTOS handles execution profiling and transfers execution to optimized traces automatically. This would allow code to run at faster native speed instead of slower emulation. Since the code is running faster, the threshold for selecting a hot trace could be set much higher than the prior art. This would also avoid generating traces for relatively infrequent code paths. Moreover, a higher threshold would enable the selection of better traces. Thus, a processor desires to execute a block of instructions, the processor first examines the Icache to determine whether the block is present. If not, the block is moved from memory to Icache. When the code is first moved into Icache, a threshold value is set into a counter associated with the particular instruction or instruction bundle (a group of instructions that can be issued together in the same cycle) of the Icache. Each time the instruction or instruction bundle is executed and retired, the counter is decremented by one. When the counter reaches zero, a trap is generated and the instruction (or instruction bundle) is designated as hot code.

After the trap is generated to firmware, a trace selector forms a trace of the hot code. The trace is followed to determine the location of the target, i.e the next instruction. The Icache maintains branch history information for the instructions in each cache line. This branch history is used to determine whether a branch should be predicted (as thus treated) as taken or to fall through. If the branch is predicted to fall through, then the subsequent instruction bundle is the next instruction. If the branch is predicted to be taken, the target instruction is the next instruction. After the trace is completed, it is optimized and stored into a trace memory portion of the physical memory. The mapping of the starting address of the original trace to the location of the optimized trace in Trace Memory (TM) is maintained in the IP-to-TM Table. The instruction fetch unit consults the IP-to-TM Table to decide whether the execution should continue with an optimized trace in the TM. There is an IP-to-TM cache in the instruction fetch unit to speed up the access of the IP-to-TM Table. The processor consults the IP-to-TM cache prior to examining the Icache. Therefore, upon subsequent execution of this code, the processor examines the IP-to-TM cache, which then points to the trace memory location. Thus, the code in the trace memory is executed instead of the original binary code. Note that if the code has not been optimized, the processor will execute the original code in the Icache. Note that the instruction from the TM (Trace Memory) will also be moved into the Icache before execution, not just the original code.

Since the inventive RTOS uses hardware managed trace address mapping, the complexity of backpatching may be eliminated. This also avoids reserving registers for passing arguments in trampoline code used in backpacking that may introduce a register spilling penalty. Furthermore, the inventive RTOS can significantly reduce the cost of handling indirect branches. Since the non-optimized code runs at native speeds, the indirect branch is allowed to execute which returns control to native code. Note that a hardware (or processor) table lookup is significantly faster than a software (or emulator) table lookup. For example, a search of the IP-to TM cache may require one cycle, whereas a software lookup of a table would require from 10 to 1000 cycles. The software lookup is expensive because the current architecture states must be saved before returning to the software RTS (Run-Time System).

The inventive RTOS uses hardware to directly process non-trace code, which significantly improves the reliability of the dynamic optimizer. The dynamic translator can choose not to translate some difficult traces and leave them unchanged in the original code, since this code will be executed at native speeds. Therefore, the time penalty for not optimized code is much lower than compared with the prior art software emulation.

Specifically, a decision in the prior art RTOS not to optimize code, meant that the code would be executed at emulator speeds. Note that in the prior art, all hot code is optimized. Furthermore, the reliability aspects are improved because less code would need to be translated, and thus fewer problems from translation will be introduced into the program application.

The inventive RTOS is controlled at the processor and at the firmware level, which is below the OS. Therefore, the inventive RTOS can handle OS code.

Therefore, it is a technical advantage of the present invention to have the run-time optimization system (RTOS) embedded into the hardware.

It is another technical advantage of the present invention that the embedded RTOS does not require software emulation for code profiling to determine hot code.

It is further technical advantage of the present invention that the embedded RTOS can substantially reduce the cost of handling indirect branches.

It is further technical advantage of the present invention that the embedded RTOS can elect not to translate difficult code, and run such code at native speeds.

It is further technical advantage of the present invention that the embedded RTOS can handle OS code in addition to user application codes.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
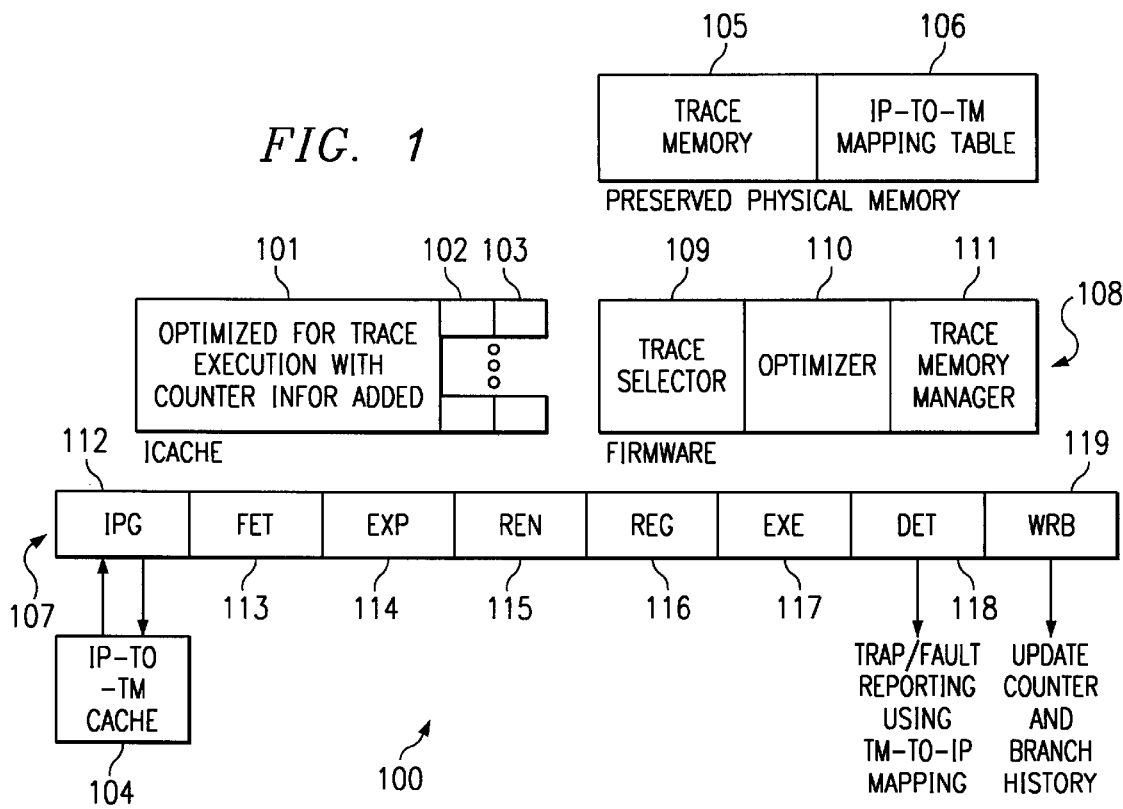
FIG. 1 depicts the inventive run-time optimization system (RTOS) that has its control loop embedded in hardware.

FIG. 1 depicts the inventive run-time optimization system (RTOS) 100 that is embedded in hardware. RTOS 100 has the control of the optimization in hardware and hardware is used to detect hot code, as well as execute both optimized and non-optimized code. Hardware also notifies the firmware via traps. The RTOS 100 uses firmware to handle trace selection, code optimization, and trace memory management, each of which require complex analysis. The balance of work between hardware and firmware is an important aspect of the inventive RTOS. The inventive RTOS distributes the different aspects of the RTOS work to the mechanism, i.e. hardware or firmware, best suited to handle the work. Thus, the inventive RTOS has both hardware and firmware aspects. The operation of RTOS 100 is transparent to the user, as control moves between hardware and firmware without user involvement. Note that firmware is microcode in ROM.

The RTOS 100 uses the instruction cache (Icache) 101 of the processor 301 to determine which code is hot code. Associated with the Icache 101 is a counter 102 and a few bits that are used to hold the branch history information associated with each instruction or instruction bundle in the Icache 101. A preferred embodiment is to have the Icache 101 holds multiple instructions per cache line, thus multiple counters 102 and registers 103 would be associated with each cache line. The number of cache lines is processor dependent, for example a Pentium II has 16K of Icache which is organized into 512 cache lines.

The RTOS uses the trace memory 105 to hold the traces of the optimized instructions. Note that trace memory 105 is a portion of RAM memory 303. RAM 303 also includes IP-to-TM mapping table (TM table) 106. This table list the mapping of the original IP of a trace to the location in the TM 105 which correspond to the optimized trace. The RTOS uses IP-to-TM cache 104, which is a TLB-like structure in the instruction fetch unit to accelerate mapping table access. The IP-to-TM cache 104 holds a smaller portion of the most active entries in the TM mapping table.

The RTOS uses firmware 108 to perform tasks which require complex analysis. Trace selector 109 forms traces of instructions, and includes branch prediction. The operation of this component and its interaction with the other RTOS components is explained in the related, co-pending application Ser. No. 09/252,567 filed Feb. 18, 1999 and entitled HARDWARE/SOFTWARE SYSTEM FOR INSTRUCTION PROFILING AND TRACE SELECTION BRANCH HISTORY INFORMATION FOR BRANCH PREDICTIONS, which is hereby incorporated by reference. Optimizer 110 optimizes the trace determined by trace selector 109. The optimized code is then placed into the trace memory 105, which is managed by trace memory manager 111.

Execution pipeline 107 depicts sequence of execution of an instruction by processor 301. The first stage is the instruction pointer generation (IPG) 112. This stage delivers an instruction pointer (IP) to Icache 101. The IP may come from several places, for example, as a corrected target address from a branch misprediction, as a predicted branch addresses, or as a next sequential address. When an instruction pointer (IP) in the user application (not shown) indicates that a particular instruction is to be executed, the processor first checks IP-to-TM cache 104 to determine whether the instruction is a starting location of a block which has been optimized and the optimized version resides in trace memory (TM) 105.

If it exists in IP-to-TM cache 104, the processor then retrieves the location of the optimized instruction in trace memory 105, and executes the optimized instruction. If it does not exist, then the processor examines Icache 101 to determine if the instruction is in Icache. If it exists in Icache 101, then the processor executes the instruction. If it does not exist, then the processor retrieves the instruction from memory 303, and places the instruction into Icache 101. This is performed in fetch stage FET 113 of the pipeline.

When the instruction is first moved into Icache 101, a threshold value is set into counter 102 associated with the particular instruction or instruction bundle in Icache 101. Each time the cache line is retired from the execution pipeline 107, i.e. execution is complete, counter 102 is decremented by one and branch history 103 is updated. When counter 102 reaches zero, a trap is generated and the instruction is designated as hot code. Note that the preferred threshold is between approximately 50 to approximately 200. Thus, the counters can be 8 bits. For comparison, the prior art threshold is as small as 5. Note that in the instruction fetch stage, a fetch address can come from several different sources, e.g. as calculated from fall through address such as (current-IP+1-line) or (current-TM+1-line), as a predicted taken branch target address in from some branch prediction hardware, or as a target address forwarded from a mispredicted branch detected at the end of execution stage.

The trap invokes firmware 108. Trace selector 109 forms a trace based on the starting instruction bundle and any surmised branch predictions which have been determined from branch history information 103. The termination of a trace will be driven by a set of heuristics including the length of the trace, the number of conditional branches encountered, the probability of accumulated branch predictions and other considerations. A trace may terminate at an indirect branch, since the target address is not known. However, the trace selector may decide to grow the trace by predicting its most recent target from some hardware branch predictor such as RTB (Branch Target Buffer). For a return branch, the trace selector would know the return address if the call instruction is in the trace, if the call instruction is not in the trace, the trace selector can predict the call site using the top address of the RSB (Return Stack Buffer). The BTB is described in "Branch Prediction Strategies and Branch Target Buffer Design", IEEE, Computer, January, 1984, which is hereby incorporated by reference.

Note that since traces (as well as any instruction either in the original binary or in the TM) are also brought into Icache 101before being executed, the profiling and trace selection may end up generating a trace on top of an existing trace. Traces can be identified, since their addresses are preserved memory (e.g. RAM), and are accessible by the RTOS. When trace lines are moved into Icache 101, their counters do not get initialized, thus they do not participate in profiling. Alternatively, if traces do participate in profiling, trace selector 109 can check whether this trace is considered "good". For example, if a trace has a frequent early exit, the trace may need to be regenerated.

After the trace has been formed, optimizer 110 will operate on the trace. The optimizer may perform any of the following optimizations: prefetch insertion (both Icache and Dcache), inlining/outlining and calling overhead reduction, instruction polarity padding, bundle compression using compact templates, unnecessary stop bits elimination, converting ST-LD (with same address) to ST-copy, convert LD-LD (with same address) to LD-copy, and constant propagation and assertion propagation. This list is by way of example only. Other optimizations may be performed so long as the processor would deliver an identical architecture state to the original binary application when traps/exceptions are raised. Once the selected trace is optimized, it is written into trace memory 105.

Trace memory manager 108 maintains the trace memory 105. The trace memory can be divided into several chunks. Traces are written into the current chunk at the next available address. When a chunk is filled up, the next chunk becomes the current chunk. When there is no chunks available, one of the existing chunks will be evicted. When a chunk is evicted, all the traces in that chunk become invalid. This will in turn trigger the elimination of address mapping entries from TM mapping table 106 and IP-to-TM cache 104. Also, invalid traces existing in Icache 101 will also be purged. Note that before a chuck is evicted, the trace manager ensures that no threads or processes are executing any of the trace in the evicted chunk. When a processor is interrupted, and the processor is executing in a trace, the processor will go back to its original binary instruction when it resumes. Thus, the trace manager forces each executing thread/process out of the trace memory by sending an interrupt signal to the processor(s). Once the entries in IP-to-TM cache 104 have been purged, no new threads and processes can enter the chunk to be evicted. Thus, the evicted chunk can then be reused.

Note that trace locality can be implemented by trace memory manager 111. Trace memory manager 111 would track the frequency of usage of traces in the mapping cache, and periodically reorganize the traces in trace memory 105 in such a manner that both sequential and temporal locality can be improved. For example, if trace A branches to trace B more frequently, then trace B will be placed next to trace A in trace memory 105. Note that if the hardware support PC-relative branches in traces to generate original IP addresses, relocating traces will be much easier.

If the next fetch address is a trace address, either a fall through from a trace address or the branch target is a trace, the fetch unit can bypass the regular instruction translation and retrieve the optimized code from trace memory 105. This operation is explained in the related, co-pending patent application entitled EFFICIENT MAPPING TO OPTIMIZED CODE FOR PROCESSOR EMBEDDED RUN-TIME OPTIMIZERS, by Benitez et al. (HP# 10981004-1), which is hereby incorporated by reference.

In the expansion stage or EXP stage 114, the instructions are decoded and PC relative branch target addresses are calculated.

REN stage 115 translates logical (virtual) register into physical registers.

REG stage 116 accesses the registers and delivers operands to all execution units.

EXE stage 117 executes the instruction.

The detection stage or DET 118 is the stage of the pipeline where the processor can check to see whether an instruction contains a trap or exception. If so, then the processor reports to the operating system, unless the trap or exception is associated with an address in trace memory, then it is reported to firmware.

The last stage of the pipeline is the write back or IRB 119. In this stage, executed instructions are retired from the pipeline. At this point counter 102 associated with the instruction would be decremented and the associated branch history information 103 would be updated. Updating the branch history allows for an accurate history as a speculative execution is performed. Note that this stage is also referred to as the retirement stage.

Figure 2:
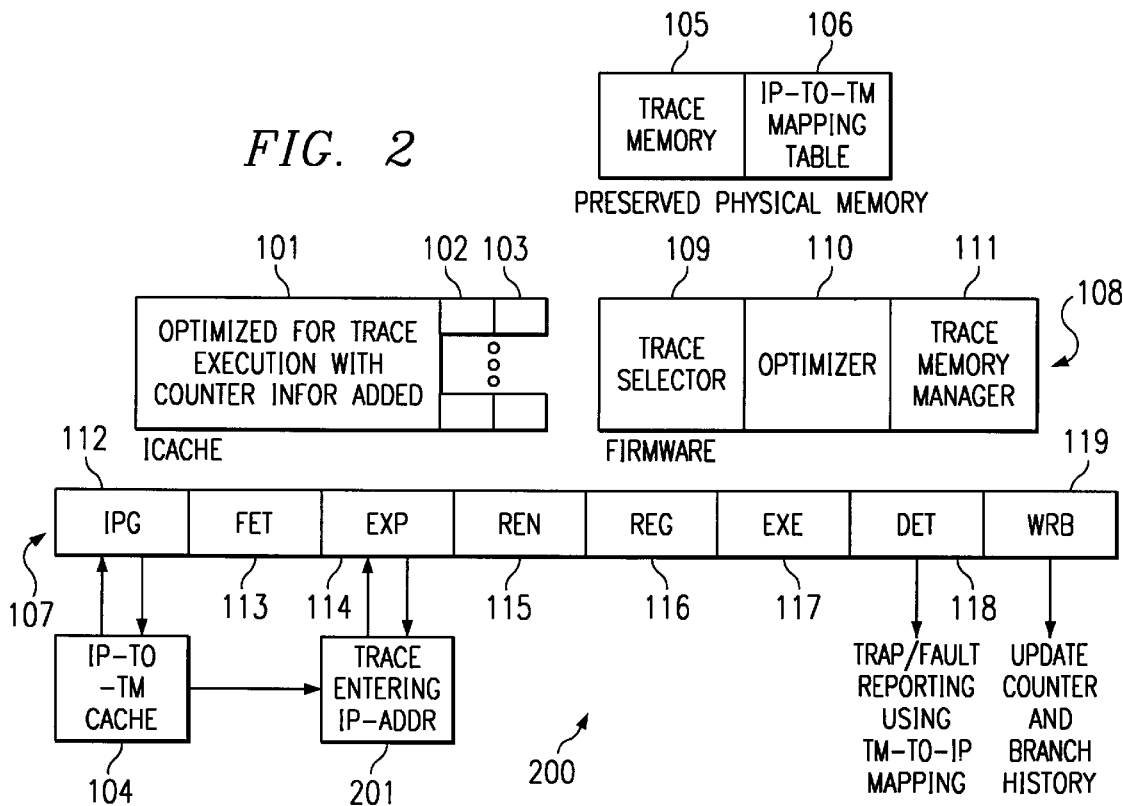
FIG. 2 depicts a version of the inventive RTOS of FIG. 1 configured to run without backpatching.

FIG. 2 depicts the inventive run-time optimization system (RTOS) 200 that is embedded in hardware, and is configured to operate without backpatching. Note that Icache 101 and counter 102 are also embedded in hardware. For exception or fault, the trace-entering IP-address 201 can be used to figure out the original IP address. This simplifies the trace memory management work, as the trace exit branches can be maintained as IP addresses. Thus, transition from trace to original binary is relatively easy. Moreover, when a trace is removed, the trace manager does not need to reinsert trampoline code (unbackpatch) at every incoming branch site. Furthermore, access protection for traces can be enforced on the IP-to-TM cache, as the only way to branch to a trace is to go through the IP-to-TM mapping. Block 201 stores the most recent trace entering IP address. The block 201 is a register that holds the most current IP address that enters the TM memory. This IP address is used to calculate the branch address in the trace. Note that most conditional branches are PC relative and not TM relative.

Note that PC-relative branches in traces may need special treatment since they are now relative to trace memory locations rather than to the original virtual IP address. This treatment may be provided by backpatching. However, backpatching makes trace memory management very difficult. For example, suppose trace A has an exit branch which jumps to trace B. Once this branch is backpatched, trace A and trace B are bound together. If trace B is part of a chunk that is to be evicted from the trace memory, then the respective branch in trace A must be unbackpatched. However, if PC-relative branches generate target addresses in the original IP addresses, then backpatching is not needed, and all traces are "relocatable", i.e. removing one trace would not affect others.

The target address of PC-relative branches in traces is computed in the context of original IP addresses instead of trace memory addresses. This is achieved by remembering the trace entering IP address in block 201 at EXP stage 114. The branch unit uses this IP address in block 201 as the base address for calculating a PC-relative branch target address for traces (instructions from TM). The offset in those PC-relative branch instructions in traces is generated based on the trace entering IP address. Thus, a branched-to-trace can be entered uniformly from going through the IP-to-TM cache instead of backpatching. For a PC-relative branch instruction in a trace, the manager 111 would use the respective entering IP address instead of the current trace address as the current PC location for target address calculation. The offset in PC-relative branches needs to be adjusted relative to the entering of IP address. This is done during trace translation/optimization time by the trace selector. The following table illustrates the address offset adjustment work. Note that the offsets are adjusted, relative to the entering IP address 1000. Further note that this table is by way of example only, and other values could be used.

| Original Binary | | Adjusted branch offset in the trace | | | |
|---|---|---|---|---|---|
| bundle address | branch offset | taken/ not taken | TM address | old bundle address | exit branch offset |
| 1000 | br +300 | not taken | 1 | 1000 | br +300 |
| 1001 | br +500 | taken | 2 | 1001 | br +2 |
| 1501 | br +200 | not taken | 3 | 1501 | br +701 |
| 1502 | br +1500 | taken | 4 | 1502 | br +503 |

-continued

| Original Binary | | Adjusted branch offset in the trace | | | |
|---|---|---|---|---|---|
| bundle address | branch offset | taken/ not taken | TM address | old bundle address | exit branch offset |
| 3002 | br +100 | not taken | 5 | 3002 | br +2102 |
| 3003 | br 2003 | taken | 6 | 3003 | br +0 |

As shown in the above table, the left side portion depicts parts of the original binary with the branch offsets listed from the current address and an indication as to whether the branches are likely to be taken or fall through. The trace selector builds a trace from these portions, as shown on the right side of the above table. The instructions of the trace are predicted to operate sequentially. Thus, TM 1 would fall through to TM 2, and so on. However, if the predicted behavior of the instruction is incorrect, i.e. mispredicted, then the trace will be exited. The target of the trace instruction is the opposite of the predicted target of the original binary. For example, TM 2 holds old bundle address 1001. The trace is built with the prediction that the branch will be taken. Hence, TM 3 contains old bundle address 1501. A misprediction indicates that the branch will not be taken, and thus will fall through, i.e. from address 1001 to 1002. Thus, the exit branch offset is +2, which when added to the entering IP address of 1000 will yield the correct IP address of 1002. Another example for the table is as follows. TM 5 holds old bundle address 3002. The trace is built with the prediction that the branch will not be taken, hence TM 6 contains old bundle address 3003. A misprediction indicates that the branch will be taken, and thus will jump from address 3002 to 3102 via the offset of +1001. Thus, the exit branch offset is +2102, which, when added to the entering IP address of 1000, will yield the correct IP address of 3102.

If all trace exit target addresses are generated from instructions in traces that are in the original IP form, then no backpatch is needed. The fetch address lookup process is also simplified, since only the fall through address calculation may generated a trace address, TAC/RSB and branch misprediction will all generate IP addresses. In this way, all branch target addresses forwarded to the IPG stage are in their original IP addresses. Such addresses will uniformly go through the IP-to-TM cache to transfer to traces if a match is found. This is further discussed in co-pending and commonly assigned U.S. Pat. No. 6,185,669, issued Feb. 6, 2001 and entitled SYSTEM FOR FETCHING MAPPED BRANCH TARGET INSTRUCTIONS OF OPTIMIZED CODE PLACED INTO A TRACE MEMORY, which is hereby incorporated by reference.

Figure 3:
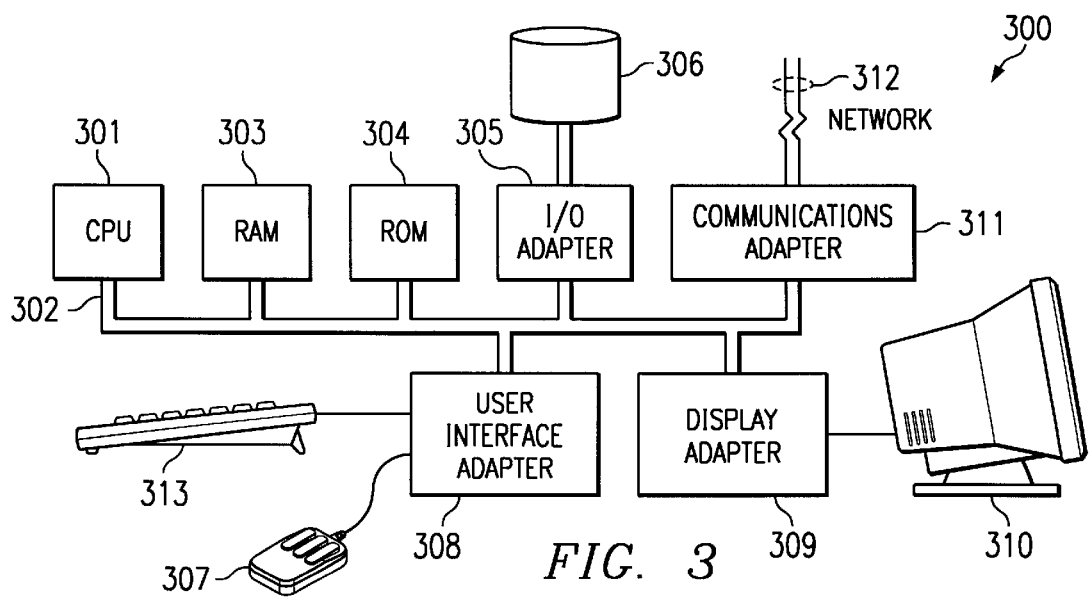
FIG. 3 depicts a high level block diagram of a computer system adapted to implement the inventive RTOS of FIGS. 1 and 2.
Figure 4:
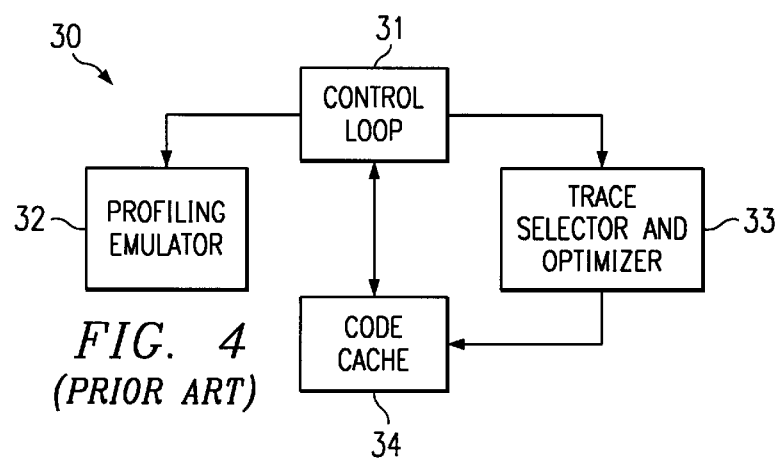
FIG. 4 depicts a prior art software emulation RTS.
Figure 5:
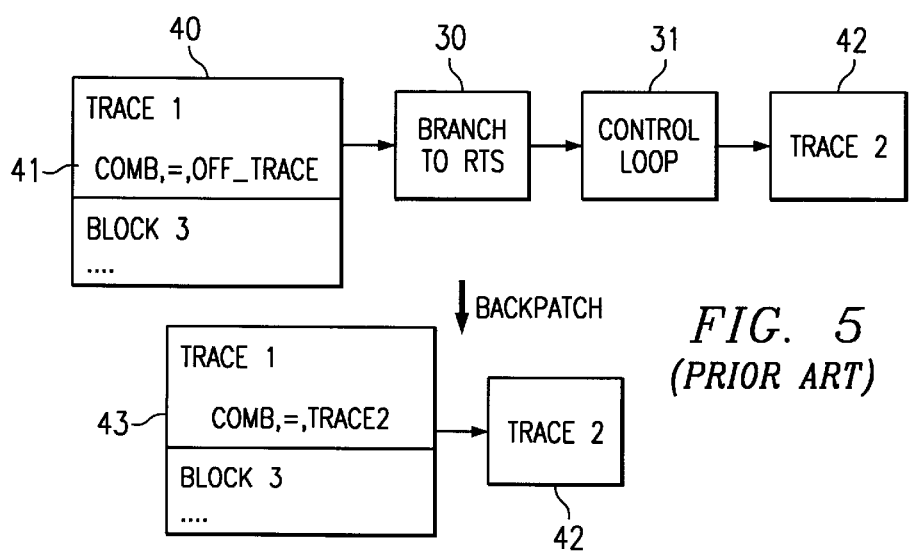
FIG. 5 depicts a prior art backpatching mechanism that is used with the system of FIG. 4.

FIG. 3 illustrates computer system 300 adapted to use the present invention. Central processing unit (CPU) 301 is coupled to bus 302. Note that Icache 101, counter 102, and IP-to-TM cache 104 are parts of processor CPU 301. In addition, bus 302 is coupled to random access memory (RAM) 303, read only memory (ROM) 304, input/output (I/O ) adapter 305, communications adapter 311, user interface adapter 308, and display adapter 309. Note, ROM 304 may be PROM, EPROM, or EEPROM. Also note, RAM 303 may be SRAM, DRAM, or SDRAM.

RAM 303 and ROM 304 hold user and system data and programs as is well known in the art. I/O adapter 305 connects storage devices 306, such as a hard drive or a CD ROM drive, to the computer system. Communications adaption 311 is adapted to couple the computer system to a local, wide-area, or Internet network 312. User interface adapter 308 couples user input devices, such as keyboard 313 and pointing device 307, to computer system 300. Finally, display adapter 309 is driven by CPU 301 to control the display on display device 310. CPU 301 may be any general purpose CPU, such as an HP PA-8200. However, the present invention is not restricted by the architecture of CPU 301 as long as CPU 301 supports the inventive operations as described herein.

Although the present invention and its advantages have been described in detail, it should be understood that various changes, substitutions and alterations can be made herein without departing from the spirit and scope of the invention as defined by the appended claims.

What is claimed is:

1. A system for optimizing a portion of a program during run-time of the program, the system comprising:

a hardware portion for detecting which instructions of the program are more frequently executed and maintaining a history of targets chosen by branch instructions of the program;

a software portion for forming an optimized trace of instructions from the most frequently executed instructions and using the history in making branch predictions for branch instructions encountered in forming the trace;

a trace memory portion that stores the optimized trace;

wherein the hardware portion comprises:

a processor cache for holding a mapping of instruction pointers to addresses of optimized trace instructions;

a processor fetch unit that retrieves an instruction of the program from memory for execution; and wherein the processor fetch unit searches the processor cache to determine whether the instruction pointer of the instruction has a mapping to a corresponding optimized trace instruction.

2. The system of claim 1, further comprising:

a table memory portion that stores a map of instruction pointers of the program to corresponding addresses in the trace memory.

3. The system of claim 2, wherein the software portion further comprises:

a trace manager that controls usage of the trace memory.

4. The system of claim 1, wherein the software portion comprises:

an optimizer which performs at least one predetermined optimization on the trace to form the optimized trace.

5. The system of claim 1, wherein the hardware portion further comprises:

a register for holding the instruction pointer of the instruction that has a mapping to a corresponding optimized trace instruction.

6. The system of claim 5, wherein the hardware portion calculates an instruction pointer of an exit from an optimized trace instruction from the instruction pointer in the register and an offset associated with the optimized trace instruction.

7. The system of claim 1, wherein the hardware portion includes an instruction cache with a first portion that maintains a plurality of values, each indicating a number of executions of a particular instruction of the program, and a second portion that stores information detailing performance of branch instructions of the program; and the software portion includes a trace selector that forms the trace and is invoked when the one value of the plurality of values reaches a predetermined number, and the trace selector begins the trace with the instruction associated with the one counter and ends the trace with an instruction selected by a predetermined criteria.

8. A method for optimizing a portion of a program during run-time of the program, the method comprising the steps of:
   detecting via hardware, which instructions of the program are more frequently executed;
   maintaining via hardware, a history of targets chosen by ranch instructions of the program;
   forming, via software, an optimized trace of instructions from the most frequently executed instructions, wherein the step of forming includes the step of using the history in making branch predictions for branch instructions encountered in forming the trace;
   storing the optimized trace in a trace memory portion;
   wherein the hardware portion comprises:
      storing, via a processor cache, a mapping of instruction pointers to addresses of optimized trace instructions;
      retrieving, via a processor fetch unit, an instruction of the program from memory for execution; and
      searching, via the processor fetch unit, the processor cache to determine whether the instruction pointer of the instruction has a mapping to a corresponding optimized trace instruction.

9. The method of claim 8, further comprising the step of:
   storing a map of instruction pointers of the program to corresponding addresses in the trace memory in a table memory portion.

10. The method of claim 9, further comprising the step of:
   controlling, via software, usage of the trace memory.

11. The method of claim 8, further comprising the step of:
   performing at least one predetermined optimization on the trace to form theoptimized trace.

12. The method of claim 8, further comprises the steps of:
   storing, via a register, the instruction pointer of the instruction that has a mapping to a corresponding optimized trace instruction.

13. The method of claim 12, further comprising the step of:
   calculating an instruction pointer of an exit from an optimized trace instruction using the instruction pointer in the register and an offset associated with the optimized trace instruction.

14. The method of claim 8, wherein
   the hardware includes an instruction cache with a first portion that maintains a plurality of values, each indicating a number of executions of a particular instruction of the program, and a second portion that stores information detailing performance of branch instructions of the program; and
   the software includes a trace selector that forms the trace and is invoked when one value of the plurality of values reaches a predetermined number and the trace selector begins the trace with the instruction associated with the one counter and ends the trace with an instruction selected by a predetermined criteria.

15. A system for optimizing a portion of a program during run-time of the program, the system comprising:
   an instruction cache with a first portion that maintains a plurality of values, each indicating a number of executions of a particular instruction of the program, and a second portion that stores a history of targets chosen by branch instructions of the program;
   a software trace selector that forms a trace of instructions, wherein the trace selector is invoked when the one value of the plurality of values reaches a predetermined number, begins the trace with the instruction associated with the one value, uses the history in making branch predictions for branch instructions encountered in forming the trace, and ends the trace with an instruction selected by a predetermined criteria;
   a software optimizer which performs at least one predetermined optimization on the trace to form the optimized trace;
   a trace memory portion that stores the optimized trace;
   a processor cache that stores a map of instruction pointers of the program to corresponding addresses in the trace memory; and
   wherein an instruction fetch unit searches the processor cache to determine whether the instruction pointer of the instruction has a mapping to a corresponding optimized trace instruction.

16. The system of claim 15, further comprising:
   a register for holding the instruction pointer of the instruction that has a mapping to a corresponding optimized trace instruction; and
   an instruction pointer of an exit from an optimized trace instruction is calculated from the instruction pointer in the register and an offset associated with the optimized trace instruction.

\* \* \* \* \*